United States Patent Office 3,346,328
Patented Oct. 10, 1967

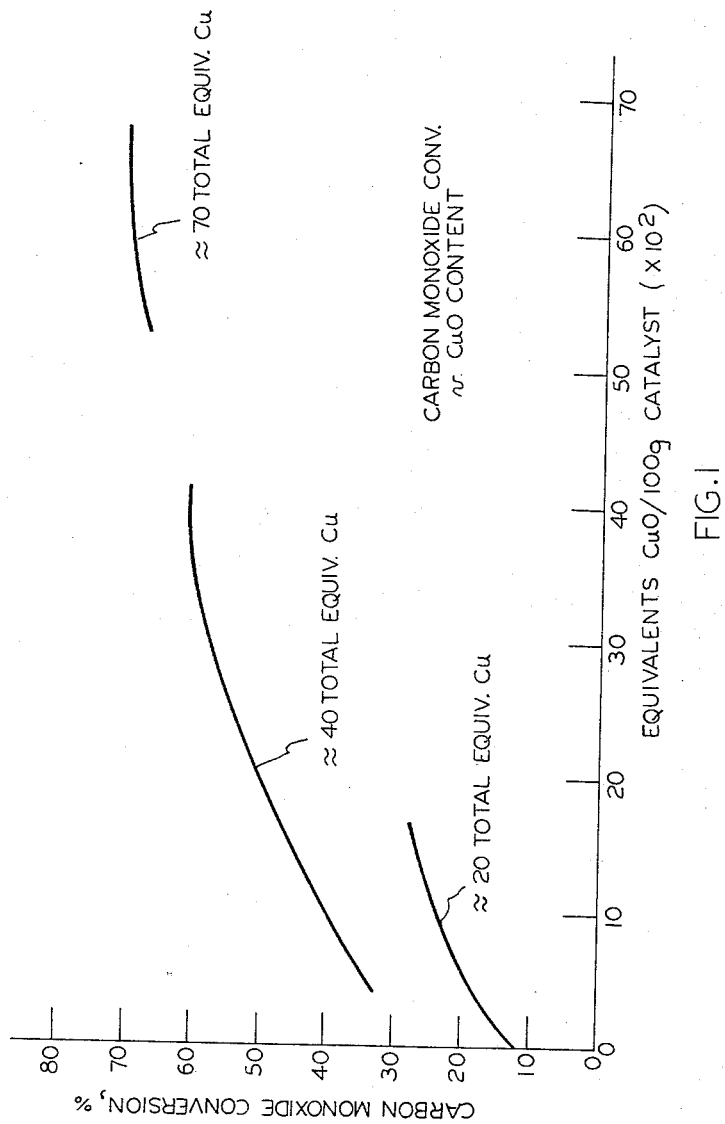

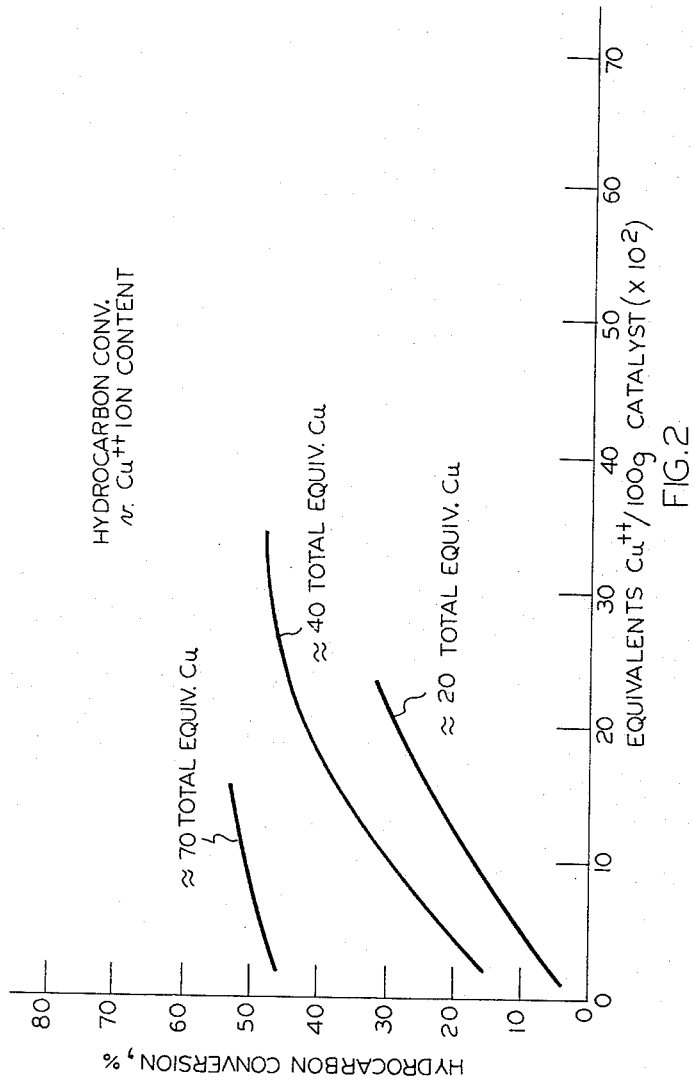

3,346,328
METHOD OF TREATING EXHAUST GASES
Francis J. Sergeys, 9917 E. Bexhill Drive, Kensington, Md. 20795; Philip K. Maher, 107 Ridgewood Road, Baltimore, Md. 21210; Warren S. Briggs, 705 Brantford Road, Silver Spring, Md. 20904; and Carl V. McDaniel, 1513 Crestview Drive, Laurel, Md. 20810
Filed Mar. 30, 1967, Ser. No. 627,226
4 Claims. (Cl. 23—2)

ABSTRACT OF THE DISCLOSURE

A process for removing the noxious components from the exhaust gases of internal combustion engines by contacting the gases with a metal catalyst upon a zeolitic base wherein a substantial portion of the metal is present as metal oxide. The balance of the metal is contained in the zeolite structure as metal ions.

---

This application is a continuation-in-part of application 296,105 filed July 18, 1963, and now abandoned. This invention relates to a new catalyst composition and method for its preparation. In one particular embodiment, it relates to an oxidation catalyst having unusual selectivity and activity characteristics for the conversion of noxious components of the exhaust gases of internal combustion engines to innocuous entities.

There has been a substantial amount of publicity in recent years on the problem of air pollution. One of the principal causes of air pollution is exhaust from internal combustion engines both automobiles and buses, trucks, etc. that use diesel powered engines. All conceivable approaches have been investigated in order to find some method for reducing the undesirable contaminants from these exhaust gases and to lessen the air pollution.

It is recognized that the most suitable method for reducing pollution would be to oxidize the air contaminants before they leave the automobile to harmless carbon dioxide. Up to the present time, an extremely efficient catalyst for this purpose which has the necessary activity as well as the desired stability under operating conditions has not been found.

We have found that a catalyst which has unusual selectivity and activity for oxidation of the hydrocarbons, carbon monoxide and other harmful components of auto exhaust can be prepared using a copper catalyst on a crystalline alumino-silicate base, wherein the copper is present as both the exchanged cupric ion and copper oxide. This catalyst is suitable either alone or as a promoter in other catalytic combinations.

Our new catalyst is prepared using a crystalline zeolite as the basic building block. Zeolites are crystalline metal aluminosilicates with a three-dimensional structure of silica and alumina tetrahedra. The charge of the anionic alumino-silicate network of the zeolite is most often balanced by non-active cations such as $H^+$, $NH_4^+$, substituted ammonium, alkali, or alkaline earth metal cations. By both cation exchange treating these zeolites with catalytically active metal ions and also depositing a portion of the metal ions as the oxide in the internal adsorption area, we are able to produce a very active and selective oxidation catalyst. Further by varying the amount of metal ion and the relative equivalent ratio of exchanged metal ion to deposited metal oxides, we are able to vary the activity and selectivity of the catalyst to meet the demands of the particular exhaust gas composition to be oxidized.

Both natural and synthetic zeolites are suitable for our product. Suitable examples of natural zeolites include faujasite, erionite, chabazite and mordenite. Synthetic zeolites which have been found suitable include, for example, those zeolites designated type A, type X, type Y, and type L by the Linde Division of Union Carbide Corporation.

In addition, synthetic sodalite and synthetic mordenite types of zeolites also give satisfactory results. The approximate gross compositions of these synthetic zeolites and their pore sizes are set out in the table below:

TABLE I

| Zeolite | Approx. Gross Composition | Pore Size (A.) |
|---|---|---|
| Type A | $MO:Al_2O_3:2SiO_2xH_2O$ | 3–5 |
| Type X | $M_2O:Al_2O_3:2-3SiO_2:xH_2O$ | 9–13 |
| Type Y | $M_{2/n}O:Al_2O_3:3-6SiO_2:xH_2O$ | 9–13 |
| Type B | $M_{2/n}O:Al_2O_3:2-10SiO_2:xH_2O$ | |
| Type L | $M_{2/n}O:Al_2O_3:2-10SiO_2:xH_2O$ | 2–3 |
| Mordenite | $M_{2/n}O:Al_2O_3:8-12SiO_2:x-H_2O$ | 6–10 | where M is a metal cation (normally in the original prepared state Na) and $n$ is its valence; and $x$ is a function of the degree of dehydration and normally ranges between 0 to 9.

The active metal cations are present in the zeolite either as exchange elements or as the metal oxides. Additional desirable characteristics are imparted to the product by loading the internal adsorption area with metal oxides. The active metal ions or oxides include those of the elements copper, cobalt, nickel, chromium, manganese, vanadium, molybdenum, Group VIII metals, yttrium and the rare earths. The preferred catalyst is prepared to contain cupric ions by exchange with a cupric salt and copper oxide by conversion of the cupric salt deposited within the pores of the zeolite. The amount of metal ions and metal oxide used is determined by the particular use intended for the finished catalyst.

In the preparation of a catalyst containing copper, for instance, the characteristics for carbon dioxide and hydrocarbon conversion can be substantially altered by altering a portion of or all of copper present as $Cu^{++}$ to $CuO$. In preparing these catalysts, for example, by using the copper salts as the source of the active metal or metal oxides, catalysts have been prepared in which from 5 to 90% of the sodium ions in the zeolite have been replaced with active metal ions and with varying amounts of active metal oxide interstitially held in the pores. Catalysts containing up to 16% copper ion in the zeolite structure and up to 30% CuO present in the pores have been prepared with excellent results.

Since the copper ion plays an important part in hydrocarbon conversion while copper oxide is an influential factor in carbon monoxide conversion, it is desirable to have some of the copper present as the ion and some as the oxide. This phenomenon facilitates the preparation of a catalyst selective to convert hydrocarbons and/or carbon monoxide preferentially, depending on the type of engine and fuel being used.

The method for preparing the initial zeolite is not part of this invention. A satisfactory method for preparing type A molecular sieve is disclosed in U.S. Patent 2,882,243. Similarly the preparation of type X molecular sieve is described in U.S. Patent 2,882,244, while type Y and its method of preparation is described in U.S. Patent 3,130,-007. In general, these processes consist of mixing a source of silica, a source of alumina and sodium hydroxide or other basic reagents, allowing the mixture to age where appropriate and finally heating at elevated temperature until the zeolite crystallizes. When a zeolite is desired in some form other than the one in which it is prepared, an additional step is included to place the zeolite in the desired form, such as the hydrogen, ammonium, etc. form.

FIGURE 1 is a plot of the oxidation conversion of carbon monoxide present in an exhaust gas as a function of CuO content of the catalyst.

FIGURE 2 is a plot of the oxidation conversion of hydrocarbon present in an exhaust gas as a function of $Cu^{++}$ ion content of the catalyst.

The process of preparing the catalyst of the instant invention consists of starting with a natural zeolite or a synthetic zeolite prepared by one of the processes described above, treating the zeolite with an aqueous solution of a salt of the desired active metal for a time necessary to effect the desired ion exchange. Any desired portion of the active metal ions is then converted to an active oxide by treatment with an appropriate alkaline solution such as sodium hydroxide. The product is finally filtered, washed and calcined.

The time for treatment of the zeolite with the salt solution to effect the desired exchange is determined by the concentration of salt solution used and the ease with which the particular zeolite undergoes exchange. The concentration of the salt solution is not critical. The maximum concentration possible in each case can be determined from the solubility of the particular salt employed.

The exchange reaction, which occurs at ambient temperature, can be carried out in any suitable manner. For example, the zeolite can be stirred in an aqueous solution of the salt or the salt solution can be poured through a column packed with the zeolite.

Following the exchange reaction, the zeolite is washed well with water and a base, such as sodium hydroxide, is added to the slurry. This step controls the ratio of $Cu^{++}$ to CuO in the product. By the addition of a suitable amount of base, the product can be made to contain the desired proportions of $Cu^{++}$ and CuO. After the treatment with the base, the product is filtered, washed with water and dried for several hours at about 110° C. After drying, the product is calcined between 650 and 1100° F. for 2 to 18 hours.

In some cases it may be desirable to increase the amount of copper present beyond the amount that would be normally exchanged. This is done by repeatedly contacting the zeolite with a strong solution of the inorganic metal salt, washing and adding sodium hydroxide to convert the desired proportion of copper to copper oxide.

The activity of our product as a catalyst for hydrocarbon and carbon monoxide conversion is measured by determining its activity index. The activity index is determined by measuring the area under an activity curve in the range of average catalyst temperatures, 350–850° F., and then calculating what percentage of this area constitutes the area under the "ideal" activity curve. "Ideal" activity is defined as 100% conversion throughout this temperature range. Thus, the activity may vary from 0 which indicates no activity to 100 which would indicate so-called "ideal" activity.

Our invention will be further illustrated by the following specific but non-limiting examples.

*Example I*

This example illustrates a general method of preparing our product.

A copper chloride ($CuCl_2$) solution was made up to contain 340 g. of $CuCl_2$ in 1000 g. of water.

A 2 lb. quantity of Z-14HS zeolite $$(Na_2O:Al_2O_3:3-6SiO_2:nH_2O)$$

pore size 9–13 Angstroms) in the sodium form was placed in 2 liters of the copper chloride solution and stirred for 5 days. Once each day the solution was removed by decantation and replaced with fresh solution. The product was filtered, washed with water, dried for 2 hours at 110° C., and then calcined at 650° F. for 2 hours.

The product was submitted for chemical analysis. The results are shown below:

| | |
|---|---|
| Total volatiles _____percent__ | 15.55 |
| $Na_2O$ (dry basis) _____do____ | 3.96 |
| $Al_2O_3$ (dry basis) _____do____ | 20.56 |
| $SiO_2$ (dry basis) _____do____ | 58.24 |
| Total copper (as CuO) _____do____ | 16.54 |
| Surface area _____m.²/g__ | 546 |
| Pore volume _____cc./g__ | 0.42 |
| Pore diameter _____A__ | 31 |

Standard analytical methods were used for determining the percentage of soda, alumina, silica, and copper in the product. Surface area and pore volume were determined using the standard Brunauer-Emmett-Teller nitrogen adsorption method. Average pore diameter was calculated from these results. Total volatiles are determined by heating a weighed sample for ½ hour at 1750° F. and then reweighing.

*Example II*

In this example, the sodium form of the zeolite Z-14HS was used as starting material.

The sodium form of the zeolite was converted into the ammonium form by treating it with $NH_4Cl$. The ammonium chloride solution was prepared by mixing 12 pounds of ammonium chloride with the minimum amount of deionized water necessary for complete solution. A total of 7 pounds (3.5 lbs., dry basis) of Z-14HS Na was column exchanged in the ammonium chloride solution. The zeolite contained 3.6% $Na_2O$ after the exchange was completed.

One half (3.5 lbs.) of the ammonium exchanged zeolite was then treated with an aqueous solution containing 110 g. of $CuCl_2$. The mixture was stirred for 24 hours, then washed, filtered, and the product, which was green in color, dried at 110° C. for 2 hours. It was then calcined at 1000° F. for 6 hours. The calcined zeolite retained the original green color.

Analytical results, determined as described in Example I, are shown below:

| | |
|---|---|
| Total volatiles _____percent__ | 12.0 |
| $Na_2O$ (dry basis) _____do____ | 2.68 |
| $Al_2O_3$ (dry basis) _____do____ | 26.82 |
| $SiO_2$ (dry basis) _____do____ | 70.68 |
| Total copper (as CuO) _____do____ | 7.55 |
| Surface area _____m.²/g__ | 522 |
| Pore volume _____cc./g__ | 0.45 |
| Pore diameter _____A____ | 34 |
| Water adsorption at 10% relative humidity _____percent__ | 24.56 |

*Example III*

The remaining half of the ammonium exchanged zeolite prepared in Example II was used to prepare the catalyst in this run.

A column was packed with the zeolite material and 5.5 liters of a 1 molar $CuCl_2$ solution poured through over a period of 2 days. The material was then filtered, washed with deionized water and calcined at 1000° F. for 2½ hours.

Chemical analysis of this product showed the following results:

| | |
|---|---|
| Total volatiles _____percent__ | 5.31 |
| $Na_2O$ (dry basis) _____do____ | 2.04 |
| $Al_2O_3$ (dry basis) _____do____ | 20.97 |
| $SiO_2$ (dry basis) _____do____ | 58.71 |
| Total copper (as CuO) _____do____ | 15.82 |
| Surface area _____m.²/g__ | 463 |
| Pore volume _____cc./g__ | 0.33 |
| Pore diameter _____A__ | 29 |
| Water adsorption at 10% relative humidity _____percent__ | 20.33 |

Example IV

In this run the catalyst was prepared to contain both active metal ions ($Cu^{++}$) and CuO in the pores of the zeolite.

A total of 1½ pounds of wet Z-14HS-$NH_4$ was placed in a column and 2.75 liters of an aqueous 1 molar $CuCl_2$ solution poured through over an 8 hour period. The material was then washed well with deionized water, filtered and reslurried. An aqueous solution containing 10 grams of NaOH was added to the slurry and mixed well. The material was again filtered, washed and calcined at 1000° F. for 3 hours.

Results of analytical tests performed on the product are shown below:

| | |
|---|---|
| $Na_2O$ _____ percent__ | 5.78 |
| Total copper (as CuO) _____ do____ | 14.81 |
| Surface area _____ m.²/g__ | 495 |
| Pore volume _____ cc./g__ | 0.36 |
| Pore diameter _____ A__ | 29 |
| Water adsorption at 10% relative humidity _____ percent__ | 19.92 |

Example V

A 6 pound quantity of Z-14HS zeolite was placed in a column and treated with 7 liters of an aqueous 1 molar solution of $CuCl_2$ over a 4 hour period. The material was then further treated with 5 liters of 2 molar $CuCl_2$ solution.

A total of 1½ pounds of the copper exchanged zeolite was washed well with deionized water, filtered, and reslurried. Twenty grams of NaOH in water was added to the slurry and mixed well. The product was filtered, washed well and finally calcined at 1000° F. for 3 hours.

Analytical tests performed on the product showed the following results:

| | |
|---|---|
| $Na_2O$ _____ percent__ | 6.01 |
| Total copper _____ do____ | 28.10 |
| Surface area _____ m.²/g__ | 235 |

Example VI

A total of 1½ pounds of wet Z-14HS-$NH_4$ was placed in a column and 2.75 liters of an aqueous 1 molar $CuCl_2$ solution poured through over an 8 hour period. The material was filtered, washed and treated with an aqueous solution containing 20 grams of NaOH. It was again filtered, washed well with water and calcined at 1000° F. for 2½ hours.

The product showed the following analytical results:

| | |
|---|---|
| Total volatiles _____ percent__ | 4.66 |
| $Na_2O$ _____ do____ | 9.82 |
| $Al_2O_3$ _____ do____ | 18.59 |
| $SiO_2$ _____ do____ | 53.21 |
| Total copper (as CuO) _____ do____ | 17.97 |
| Surface area _____ m.²/g__ | 739 |
| Pore volume _____ cc./g__ | 0.37 |
| Pore diameter _____ A__ | 20 |
| Water adsorption of 10% relative humidity _____ percent__ | 18.69 |

Example VII

A 1½ pound quantity of the copper exchanged zeolite prepared in Example V was used to prepare the catalyst in this run. The material was washed well, filtered and reslurried with water. Forty-eight grams of NaOH were added to the slurry and mixed well. The product was filtered, washed well with water and finally calcined for 3 hours at 1000° F.

Chemical analysis of the product showed the following results:

| | |
|---|---|
| $Na_2O$ _____ percent__ | 8.69 |
| Total copper (as CuO) _____ do____ | 28.15 |
| Surface area _____ m.²/g__ | 292 |

Example VIII

The activity of our catalysts was evaluated in a series of runs in which the conversion of hydrocarbons and carbon monoxide as a function of average catalyst temperature was determined after the catalysts had been calcined for 3 hours at 1000° F. This conversion is determined by passing a mixture of gases over the catalyst maintained at predetermined temperatures at a gaseous hourly space velocity of 5000 volumes of gas per volume of catalyst per hour. The mixture of gases used for this test contained 3.85% carbon monoxide, 1000 parts per million of normal hexane, 10% water, 4.5% oxygen and the balance nitrogen.

The activity indices of the catalysts of Examples II through VII and two additional catalysts (Examples IIa and IIb) prepared in the same manner but having different $Na_2O$, $Cu^{++}$, and CuO contents were determined by evaluating the conversion data obtained from Example VIII in the manner described herein in lines 46–56 of column 3. The data is summarized and the order of the examples arranged according to composition to better illustrate the importance of the copper ion and copper oxide content on the oxidation activity of the catalyst, in Table II.

TABLE II

| Example | Gram Equivalents per 100 g. Catalyst | | | | Activity Index | |
|---|---|---|---|---|---|---|
| | Total Copper | $Cu^{++}$ | CuO | $Na_2O$ | CO | Hydrocarbon |
| II | 0.19 | 0.19 | | 0.09 | 12.3 | 27.3 |
| IIa | 0.18 | 0.13 | 0.05 | 0.29 | 21.2 | 20 |
| IIb | 0.17 | 0.02 | 0.15 | 0.39 | 24.6 | 4.9 |
| III | 0.40 | 0.34 | 0.06 | 0.07 | 34.9 | 45.7 |
| IV | 0.37 | 0.21 | 0.16 | 0.19 | 45.4 | 45.4 |
| VI | 0.45 | 0.04 | 0.41 | 0.32 | 61.2 | 18.7 |
| V | 0.70 | 0.14 | 0.56 | 0.19 | 63.6 | 50.5 |
| VII | 0.71 | 0.04 | 0.67 | 0.28 | 69.8 | 48.2 |

It can be seen from the above table that the carbon monoxide and hydrocarbon activities can be varied independently over a wide range by varying the copper and copper oxide content. A comparison of Example III wherein the copper was present essentially as cupric ion with Example VII wherein the copper was present essentially as copper oxide showed the difference in carbon monoxide conversion that can be achieved by increasing the percentage of copper oxide present in the catalyst. By changing the ratios, the amount of carbon monoxide converted increased from 34.9 to 69.8 percent. Although there was some improvement in hydrocarbon conversion, this improvement was not as dramatic as the improvement of conversions for carbon monoxide. The amount of copper present in the catalyst also has a bearing on the CO and hydrocarbon conversion as is shown by comparison of the data for Example IV with Example V.

Further, from the above table it may be seen that in order to have desirable oxidation characteristics for both carbon monoxide and hydrocarbons the catalyst should contain at least 0.1 gram equivalent of copper per 100 grams of total zeolite (crystalline zeolite including the copper oxide dispersed with the pores and the cupric ions replacing the original sodium ions (M)) and that this copper must be present both as the cupric exchange ion and as copper oxide dispersed within the zeolite pores. And preferably the catalyst should contain 0.01 to 0.50 gram equivalent of cupric ions per 100 grams of total zeolite in order to promote the oxidation of hydrocarbons and at least 0.05 gram equivalent of copper oxide per 100 grams of total zeolite to promote the oxidation of carbon monoxide.

As may be seen from the figures the conversions of both the carbon monoxide and hydrocarbon are a function of the total amount of copper present and that within a given total copper content the respective selectivity for carbon monoxide conversion and hydrocarbon conversion is a function respectively of the relative quantity of copper present as copper oxide and Cu++ ion.

Thus by comparing the 0.20, 0.40, and 0.70 approx. gram equiv. total copper present per 100 g. catalyst plots in either figure it is evident that the conversion of both carbon monoxide and hydrocarbon increases with total copper. The selectivity may best be seen from the plots representing a total copper content of approximately 0.40 gram equivalent of copper per hundred grams of catalyst; note in FIGURE 1 the conversion of carbon monoxide advances from 34.9% to 61.2% as the CuO content is increased from 0.06 to 0.41 gram equivalent, while as shown by FIGURE 2 the conversion of hydrocarbon advances from 18.7 to 45.7 as the Cu++ ion content is increased from 0.04 to 0.34 gram equivalent. Similar results are shown by the low total copper (approx. 0.20 gram equiv. per 100 g. cat.) and the high total copper plots (approx. 0.70 gram equiv. per 100 g. cat.).

In effecting the oxidation of air pollutants in exhaust gases according to our invention, the exhaust gas and a gas containing oxygen, normally air, are passed over or through a catalyst bed comprising our catalyst at a temperature of 400 to 1100 F. The pressure is not critical and usually is only slightly above atmospheric pressure. The oxidation of exhaust gases from internal combustion engines is easily facilitated according to our invention by placing the catalyst described herein in a conventional muffler type device.

Obviously many modifications and variations of the invention may be made without departing from the essence and scope thereof and only such limitations should be applied as are indicated in the claims.

What is claimed is:
1. A method of treating exhaust gases comprising air pollutants comprising carbon monoxide and hydrocarbons by substantially oxidizing said air pollutants, comprising passing a mixture of said exhaust gases and a gas comprising oxygen through a catalyst bed comprising a crystalline zeolite having a porous structure and having an approximate composition in the range

$$M_{2/n}O:Al_2O_3:2-12SiO_2:xH_2O$$

where M is a metal cation and $n$ is its valence and $x$ is a function of the degree of dehydration having at least 0.10 gram equivalent of copper per hundred grams of total zeolite and wherein said copper consists of cupric ions which form a portion of the metal cations (M) and copper oxide dispersed within the pores of the zeolite, at a temperature of from 400 to 1100° F.

2. The process of claim 1 wherein M comprises 0.01 to 0.50 gram equivalent of cupric ion per 100 grams of total crystalline zeolite.

3. The process of claim 1 wherein the catalyst contains at least 0.05 gram equivalent of copper oxide dispersed upon the zeolite per 100 grams of total zeolite.

4. The process of claim 2 wherein the catalyst contains at least 0.05 gram equivalent of copper oxide dispersed upon the zeolite per 100 grams of total zeolite.

References Cited

UNITED STATES PATENTS 3,177,152   4/1965   Kearby _____ 23—2 X

EARL C. THOMAS, *Primary Examiner.*